United States Patent
Pekala et al.

(10) Patent No.: US 10,975,208 B2
(45) Date of Patent: *Apr. 13, 2021

(54) FREESTANDING, DIMENSIONALLY STABLE MICROPOROUS WEBS

(71) Applicant: AMTEK RESEARCH INTERNATIONAL LLC, Lebanon, OR (US)

(72) Inventors: Richard W. Pekala, Corvallis, OR (US); Daniel K. Lee, Lebanon, OR (US); James E. Emanuel, Corvallis, OR (US); Robert Waterhouse, Lebanon, OR (US); Weston J. Wood, Lebanon, OR (US); Andrew Wimer, Lebanon, OR (US)

(73) Assignee: AMTEK RESEARCH INTERNATIONAL LLC, Lebanon, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/812,581

(22) Filed: Nov. 14, 2017

(65) Prior Publication Data

US 2018/0248164 A1    Aug. 30, 2018

Related U.S. Application Data

(63) Continuation of application No. 14/775,604, filed as application No. PCT/US2014/030683 on Mar. 17, 2014, now Pat. No. 9,847,519.

(Continued)

(51) Int. Cl.
*C08J 5/18* (2006.01)
*C08J 7/04* (2020.01)

(Continued)

(52) U.S. Cl.
CPC ............... *C08J 5/18* (2013.01); *C08J 7/043* (2020.01); *C08J 7/0423* (2020.01);
(Continued)

(58) Field of Classification Search
CPC .......... H01M 2/1686; C08J 7/045; C08J 5/18; C08J 2323/06
See application file for complete search history.

(56) References Cited

U.S. PATENT DOCUMENTS 3,357,791 A    12/1967  Napier
7,008,979 B2   3/2006   Schottman et al.
(Continued)

FOREIGN PATENT DOCUMENTS

CN   102449809 A   5/2012
JP   200431277 A   1/2004
(Continued)

OTHER PUBLICATIONS

U.S. Appl. No. 14/775,604, Notice of Allowance, dated Aug. 15, 2017, 19 pages.
(Continued)

*Primary Examiner* — Hai Vo
(74) *Attorney, Agent, or Firm* — Stoel Rives LLP

(57) ABSTRACT

A thin, freestanding, microporous polyolefin web with good heat resistance and dimensional stability includes an inorganic surface layer. A first preferred embodiment is a microporous polyolefin base membrane in which colloidal inorganic particles are present in its bulk structure. Each of second and third preferred embodiments is a thin, freestanding microporous polyolefin web that has an inorganic surface layer containing no organic hydrogen bonding component for the inorganic particles. The inorganic surface layer of the second embodiment is achieved by hydrogen bonding with use of an inorganic acid, and the inorganic surface layer
(Continued)

Cross-sectional schematic of microporous inorganic layers at the surfaces of a polyolefin membrane.

of the third embodiment is achieved by one or both of hydrogen bonding and chemical reaction of the surface groups on the inorganic particles.

18 Claims, 5 Drawing Sheets

Related U.S. Application Data

(60) Provisional application No. 61/864,448, filed on Aug. 9, 2013, provisional application No. 61/801,376, filed on Mar. 15, 2013.

(51) Int. Cl.
  *H01M 50/449* (2021.01)
  *H01M 50/403* (2021.01)
  *H01M 50/411* (2021.01)
  *H01M 50/431* (2021.01)
  *H01M 50/446* (2021.01)
  *C08J 7/043* (2020.01)
  *H01M 10/0525* (2010.01)

(52) U.S. Cl.
  CPC ....... *H01M 50/403* (2021.01); *H01M 50/411* (2021.01); *H01M 50/431* (2021.01); *H01M 50/446* (2021.01); *H01M 50/449* (2021.01); *C08J 2323/06* (2013.01); *C08J 2409/04* (2013.01); *H01M 10/0525* (2013.01); *Y10T 428/249955* (2015.04); *Y10T 428/249958* (2015.04); *Y10T 428/249962* (2015.04)

(56) References Cited

U.S. PATENT DOCUMENTS

| | | | | |
|---|---|---|---|---|
| 8,795,826 B2* | 8/2014 | Lee | ........................ | H01M 2/145 428/316.6 |
| 9,209,502 B2* | 12/2015 | Ueki | ................... | H01M 2/1653 |
| 9,847,519 B2* | 12/2017 | Pekala | ........................ | C08J 5/18 |
| 2003/0203991 A1 | 10/2003 | Schottman et al. | | |
| 2006/0073345 A1 | 4/2006 | Naruse | | |
| 2011/0020692 A1 | 1/2011 | Ikemoto et al. | | |
| 2012/0034509 A1* | 2/2012 | Bae | ..................... | H01M 2/1653 429/145 |
| 2012/0145468 A1 | 6/2012 | Pekala et al. | | |
| 2014/0045033 A1 | 2/2014 | Zhang et al. | | |
| 2015/0030933 A1* | 1/2015 | Goetzen | .............. | H01M 2/1646 429/231.95 |

FOREIGN PATENT DOCUMENTS

| | | |
|---|---|---|
| JP | 2012521615 A | 9/2012 |
| WO | 2009099088 A1 | 8/2009 |
| WO | 2010108148 A1 | 9/2010 |
| WO | 2012043501 A1 | 4/2012 |

OTHER PUBLICATIONS

Cabot Corporation, "CAB-O-SPERSE", MSDS, www.cabot-corp.com/Silicas-And-Aluminas/Products/Downloads/DL201407081802PM7359/, Published Jul. 5, 2007, retrieved Jan. 1, 2016, 4 pages.

E. I. Du Pont De Nemours and Co, "Ludox—Technical Literature", URL: http://nathan.instras.com/documentDB/paper-190.pdf, retrieved Jul. 22, 2017, 1999, 4 pages.

Hirvikorpi, et al., "Effect of corona pre-treamtment on the performance of gas barrier layers applied by the atomic layer deposition onto polymer-coated paperboard", Applied Surface Science, vol. 257, Jul. 24, 2010, retrieved Jul. 15, 2014, pp. 736-740.

PCT/US2014/030683, International Search Report and Written Opinion, dated Aug. 8, 2014, 11 pages.

* cited by examiner

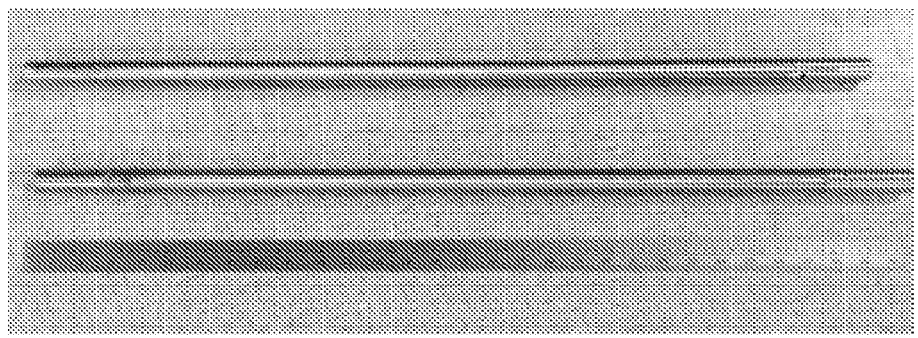
Fig. 1 Mayer rod photograph.

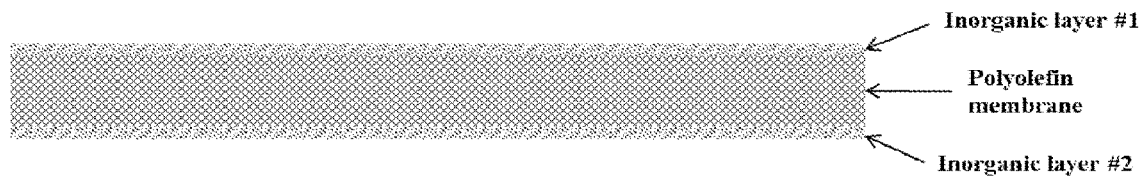

Fig. 3 Cross-sectional schematic of microporous inorganic layers at the surfaces of a polyolefin membrane.

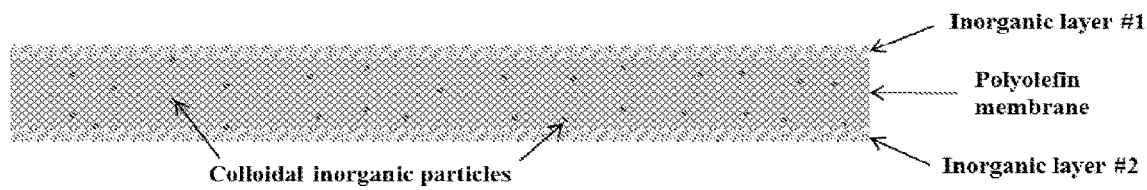

Fig. 4 Cross-sectional schematic of microporous inorganic layers at the surfaces of a colloid-modified polyolefin membrane.

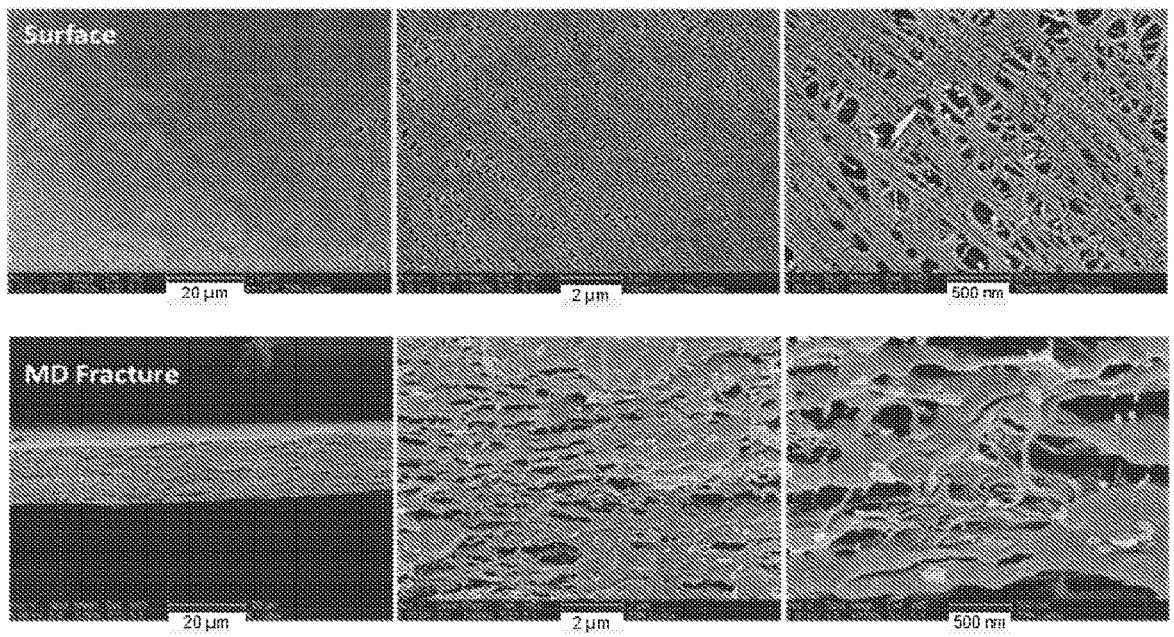

Fig. 5 Scanning electron micrographs of the surface and bulk structure of the separator dip coated through a 20% colloidal silica solution. The colloidal silica particles in the bulk were confirmed with energy dispersive x-ray analysis. The silica particles are the bright white spots in the highest magnification MD fracture photograph.

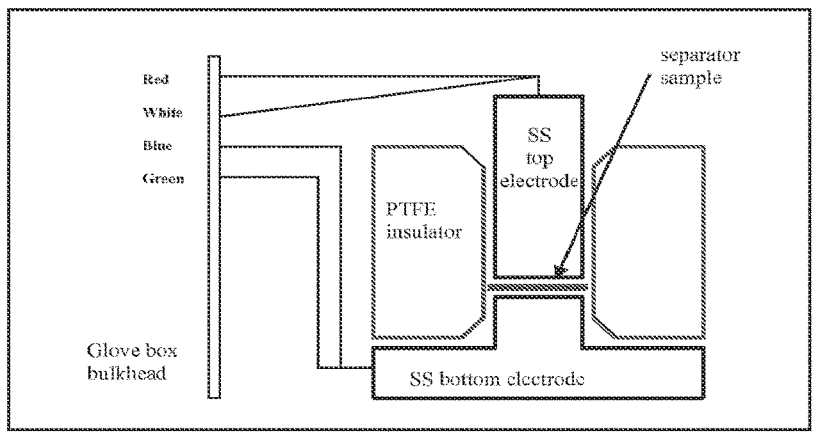
Fig. 6  Stainless steel fixture for electrical resistance measurement.
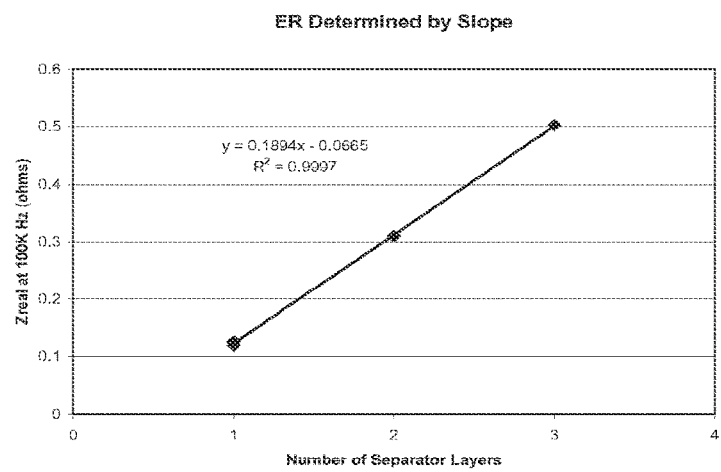
Fig. 7  ER determined by slope of line for 1, 2, and 3 layers of separator.
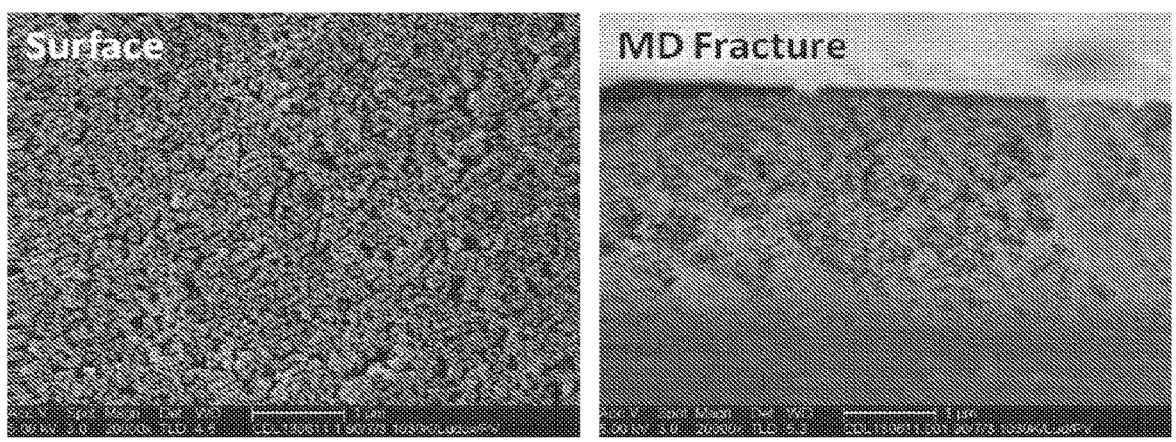
Fig. 8  SEM images of silica-coated separator from Example 9.

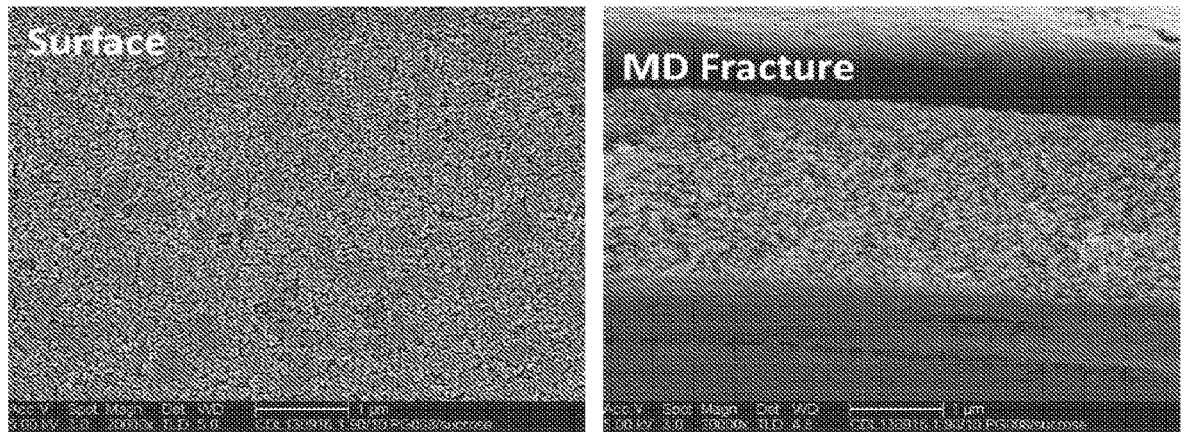
Fig. 9 SEM images of inorganic surface layer with 90/10 alumina/sucrose.
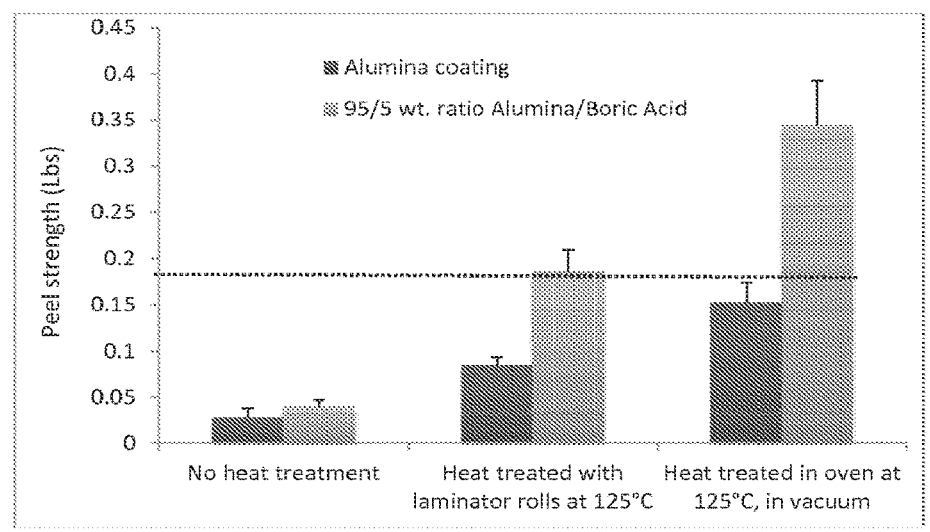
Fig. 10 Peel strength of inorganic surface layer-coated separators under various heat-treated conditions.

FREESTANDING, DIMENSIONALLY STABLE MICROPOROUS WEBS

RELATED APPLICATIONS

This application is a continuation of U.S. patent application Ser. No. 14/775,604, filed Sep. 11, 2015, which is a U.S. national phase application of International Patent Application No. PCT/US2014/030683, filed Mar. 17, 2014, which claims the benefit of U.S. Patent Application Nos. 61/864,448 and 61/801,376, filed August 9 and Mar. 15, 2013, respectively, the contents of all of which are incorporated herein by reference.

TECHNICAL FIELD

The present disclosure relates to the formation of freestanding polyolefin webs that (1) exhibit good in-plane dimensional stability (i.e., low shrinkage) at temperatures both above and below the melting point of the base polymer membrane and (2) maintain shutdown properties. At high temperatures, the pores within the bulk structure of the base polymer membrane can begin to collapse or shut down and thereby modify its permeability. Such webs can be used as separators to improve the manufacturability, performance, and safety of energy storage devices such as lithium-ion batteries.

BACKGROUND INFORMATION

Separators are an integral part of the performance, safety, and cost of lithium-ion batteries. During normal operation, the principal functions of the separator are to prevent electronic conduction (i.e., short circuit or direct contact) between the anode and cathode while permitting ionic conduction by means of the electrolyte. For small commercial cells under abuse conditions, such as external short circuit or overcharge, the separator is required to shutdown at temperatures well below those at which thermal runaway can occur. This requirement is described in Doughty. D, *Proceedings of the Advanced Automotive Battery Conference*, Honolulu, Hi. (June 2005). Shutdown results from the collapse of pores in the separator caused by melting and viscous flow of the polymer, thus slowing down or stopping ion flow between the electrodes. Nearly all lithium-ion battery separators contain polyethylene as part of a single- or multi-layer construction so that shutdown often begins at about 130° C., the melting point of polyethylene.

Separators for the lithium-ion market are presently manufactured through the use of "dry" or "wet" processes. Celgard LLC and others have described a dry process, in which polypropylene (PP) or polyethylene (PE) is extruded into a thin sheet and subjected to rapid drawdown. The sheet is then annealed at 10-25° C. below the polymer melting point such that crystallite size and orientation are controlled. Next, the sheet is rapidly stretched in the machine direction (MD) to achieve slit-like pores or voids. Trilayer PP/PE/PP separators produced by the dry process are commonly used in lithium-ion rechargeable batteries.

Wet process separators composed of polyethylene are produced by extrusion of a plasticizer/polymer mixture at elevated temperature, followed by phase separation, biaxial stretching, and extraction of the pore former (i.e., plasticizer). The resultant separators have elliptical or spherical pores with good mechanical properties in both the machine and transverse directions. PE-based separators manufactured this way by Toray Tonen Specialty Separator, Asahi Kasel Corp., SK Innovation Co., Ltd., and Entek® Membranes LLC have found wide use in lithium-ion batteries.

More recently, battery failures arising in commercial operation have demonstrated that shutdown is not a guarantee of safety. The principal reason is that, after shutting down, residual stress and reduced mechanical properties above the polymer melting point can lead to shrinkage, tearing; or pinhole formation. The exposed electrodes can then touch one another and create an internal short circuit that leads to more heating, thermal runaway, and explosion.

In the case of large format lithium-ion cells designed for hybrid or plug-in hybrid applications (HEV, PHEV), the benefits of separator shutdown have been openly questioned because it is difficult to guarantee a sufficient rate and uniformity of shutdown throughout the complete cell. This issue is described in Roth, E. P., *Proceedings of Lithium Mobile Power Conference*, San Diego, Calif. (October 2007). Many companies are focused, therefore, on modifying the construction of a lithium-ion battery to include (1) a heat-resistant separator or (2) a heat-resistant layer coated on either the electrodes or a conventional polyolefin separator. Heat-resistant separators composed of high temperature polymers (e.g., polyimides, polyester, polyphenylene sulfide) have been produced on a limited basis from solution casting, electrospinning, or other process technologies. In these cases, the high polymer melting point prevents shutdown at temperatures below 200° C.

U.S. Patent Application Pub. No. US 2012/0145468 describes a freestanding, microporous, ultrahigh molecular weight polyethylene (UHMWPE)-based separator that contains sufficient inorganic filler particles to provide low shrinkage while maintaining high porosity at temperatures above the melting point of the polymer matrix (>135° C.). Such freestanding, heat resistant separators have excellent wettability and ultralow impedance, but they do not exhibit shutdown properties because of the high loading level of the inorganic filler.

U.S. Pat. No. 7,638,230 B2 describes a porous heat resistant layer coated onto the negative electrode of a lithium-ion secondary battery. The heat resistant layer is composed of an inorganic filler and a polymer binder. Inorganic fillers include magnesia, titanic, zirconia, or silica, Polymer binders include polyvinylidene fluoride and a modified rubber mixture containing acrylonitrile units. Higher binder contents negatively impact the high rate discharge characteristics of the battery.

U.S. Patent Application Pub. Nos. US 2008/0292968 A1 and US 2009/0111025 A1 each describe an organic/inorganic separator in which a porous substrate is coated with a mixture of inorganic particles and a polymer binder to form an active layer on at least one surface of the porous substrate. The porous substrate can be a non-woven fabric, a membrane, or a polyolefin-based separator. Inorganic particles are selected from a group including those that exhibit one or more of dielectric constant greater than 5, piezoelectricity, and lithium ion conductivity. Selected polymer binders are described. The composite separator is said to exhibit excellent thermal safety, dimensional stability, electrochemical safety, and lithium ion conductivity, compared to uncoated polyolefin-based separators used in lithium-ion batteries. In the case of certain polymer binders mixed with the inorganic particles, a high degree of swelling with an electrolyte can result in the surface layer, but rapid wetting or swelling is not achieved in the polyolefin substrate.

In the latter two of the above approaches, there is an inorganic-filled layer that is applied in a secondary coating operation onto the surface of an electrode or porous substrate to provide heat resistance and prevent internal short circuits in a battery.

SUMMARY OF THE DISCLOSURE

There has been, heretofore, no consideration of the differential shrinkage to be expected between the inorganic surface layers and a microporous polyolefin base membrane as the web is heated, Such differential shrinkage provides stress at the interface between the inorganic surface layer and the polyolefin base membrane such that fractures or cracks may appear at elevated temperature during shutdown of the separator, No consideration has been given to a coating formulation that contains colloidal particles that penetrate into the bulk structure of a microporous polyolefin base membrane to improve its dimensional stability and maintain shutdown properties, while simultaneously achieving inorganic surface layers that further prevent internal short circuits and provide good heat resistance and in-plane dimensional stability. Moreover, no consideration has been given to an inorganic surface layer containing less than or equal to 5 wt % of an organic hydrogen bonding component while achieving good in-plane dimensional stability above the melting point of the microporous polyolefin base membrane. The organic hydrogen bonding component can be either a polymer or a small molecule with multiple acceptor or donor sites for hydrogen bonding. This disclosure also identifies cost-effective methods of application of such coating formulations to a microporous polyolefin membrane.

A thin, freestanding, microporous polyolefin web with good heat resistance and dimensional stability includes an inorganic surface layer. A first preferred embodiment is a microporous polyolefin base membrane in which colloidal inorganic particles are present in its bulk structure. This embodiment simultaneously achieves penetration of colloidal inorganic particles into the polyolefin base membrane to reduce interfacial stress and maintains shutdown characteristics. A modification to the first preferred embodiment is a polyolefin web that includes an inorganic surface layer containing fumed alumina particles and less than or equal to 5 wt. % of an organic hydrogen bonding component to achieve a polyolefin web having good in-plane dimensional stability above the melting point of the polyolefin base membrane. Each of second and third preferred embodiments is a thin, freestanding microporous polyolefin web that has an inorganic surface layer containing no organic hydrogen bonding component for the inorganic particles. The inorganic surface layer of the second embodiment is achieved by hydrogen bonding with use of an inorganic acid, and the inorganic surface layer of the third embodiment is achieved by one or both of hydrogen bonding and chemical reaction of the surface groups on the inorganic particles.

Applicants believe that mechanical interlocking between the inorganic particles and the surface pores of the polyolefin base membrane helps to bond the inorganic surface layer to the membrane, thereby creating reasonable peel strength with limited particle shedding during handling of the polyolefin web.

Several embodiments of the microporous, freestanding heat resistant polyolefin web rely upon ultrahigh molecular weight polyethylene (UHMWPE) as a polyolefin base membrane component. The repeat unit of polyethylene is $(-CH_2CH_2-)_x$, where x represents the average number of repeat units in an individual polymer chain. In the case of polyethylene used in many film and molded part applications, x equals about 10,000; whereas for UHMWPE, x is approximately 150,000. This extreme difference in the number of repeat units is responsible for a higher degree of chain entanglement and the distinctive properties associated with UHMWPE.

One such property is the ability of UHMWPE to resist material flow under its own weight when heated above its melting point. This phenomenon is a result of its ultrahigh molecular weight and the associated long relaxation times, even at elevated temperatures. Although UHMWPE is commonly available, it is difficult to process into fiber, sheet, or membrane form. The high melt viscosity requires a compatible plasticizer and a twin screw extruder for disentanglement of the polymer chains such that the resultant gel can be processed into a useful form. This approach is commonly referred to as "gel processing." In many cases, other polyolefins are blended with UHMWPE to lower the molecular weight distribution to impact properties after extraction of the plasticizer, which extraction results in a porous membrane. The terms "separator" and "web" describe an article that includes an inorganic surface layer and a polyolefin base membrane.

For most of the preferred embodiments described, the microporous polyolefin membrane is manufactured by combining UHMWPE, high density polyethylene (HDPE), and a plasticizer (e.g., mineral oil). A mixture of UHMWPE and HOPE is blended with the plasticizer in sufficient quantity and extruded to form a homogeneous, cohesive mass. The mass is processed using blown film, cast film, or calendering methods to give an oil-filled sheet of a reasonable thickness (<250 μm). The oil-filled sheet can be further biaxially oriented to reduce its thickness and effect its mechanical properties. In an extraction operation, the oil is removed with a solvent that is subsequently evaporated to produce a microporous polyolefin membrane that is subsequently coated with an inorganic surface layer.

In a first preferred embodiment, the polyolefin base membrane is passed through an aqueous-based dispersion, such as an alcohol/water dispersion of silica. This aqueous-based dispersion contains a number of colloidal particles that can penetrate through the surface and into the bulk structure of the polyolefin membrane such that the colloidal particles are distributed into the polymer matrix. At high temperatures, the pores within the bulk structure of the base polyolefin membrane can begin to collapse or shut down, thereby modifying its permeability, even though there are colloidal inorganic particles distributed throughout the bulk structure. In addition to penetration of the colloidal particles into the bulk structure of the polyolefin base membrane, a surface coating of controlled thickness can be formed with wirewound rods (i.e., Mayer rods, shown in FIG. 1) as the membrane is pulled through the aqueous-based dispersion. The wetted membrane is subsequently dried with a series of air knives and an oven in which hot air is used to evaporate the solvent. The combination of dip coating and wire-wound rods has, heretofore, not been used to achieve the abovemodified polyolefin base membrane.

In a modification to the first preferred embodiment; the polyolefin base membrane is passed through an aqueousbased dispersion of (1) fumed alumina or (2) an aqueousbased dispersion of fumed silica combined with colloidal silica. The alumina or silica particles enable formation of an inorganic surface layer on the polyolefin base membrane through the use of an organic hydrogen bonding component. Preferred organic hydrogen bonding components include both polymers and small molecules with multiple hydrogen bonding sites. Preferred polymers include polyvinyl alcohol (PVOH), polyvinylpyrrolidone (PVP), carboxymethyl cellulose (CMC), polyacrylic acid, and polyethylene oxide. Preferred small molecules include catechol, sucrose, tannic acid, maltitol, dimethylol dihydroxyethylene urea (DMD-HEU), and pentaerythritol. The resultant separators exhibit excellent high temperature thermal stability and low Gurley (i.e., high air permeability) values.

In a second preferred embodiment, an inorganic surface layer is formed on the polyolefin base membrane without use of an organic hydrogen bonding component. The polyolefin base membrane is passed through an aqueous-based dispersion of fumed alumina that includes an inorganic acid. The resultant separators exhibit high temperature thermal stability and low Gurley values. Furthermore, the peel strength of the inorganic surface layer can be improved through heat treatment of the coated polyolefin membrane. Preferred inorganic acids include phosphoric acid ($H_3PO_4$), pyrophosphoric acid ($H_4P_2O_7$), metaphosphoric acid ($HPO_3$), phosphorous acid ($HP_3O_3$), trimetaphosphoric acid ($H_3P_3O_9$), boric acid ($H_3BO_3$), tetraboric acid ($H_2B_4O_7$), vanadic acid ($HVO_3$), and molibdic acid ($H_2MoO_4$).

In a third preferred embodiment, an inorganic surface layer is formed on the polyolefin base membrane from only inorganic particles, some of which can be colloidal in nature and penetrate into the bulk structure. The polyolefin base membrane is passed through an aqueous-based dispersion of fumed alumina. The resultant separators exhibit high temperature thermal stability and low Gurley values. Furthermore, the peel strength of the inorganic surface layer can be improved through heat treatment of the coated polyolefin membrane and reaction of the surface hydroxyl groups on the inorganic particles. Preferred inorganic particles include metal oxides such as silica, alumina, titania, and zirconia.

Finally, for each of the above embodiments, corona treatment of the polyolefin-based membrane can improve the overall peel strength of the coated separator. Applicants believe that oxygen-containing species (e.g., hydroxyl groups) resulting from the corona treatment of the polyolefin membrane surface hydrogen bond with the inorganic particles to improve the adhesive strength at the interface between the inorganic surface layer and the polyolefin membrane.

The resultant microporous, freestanding polyolefin separator as described for each of the three preferred embodiments can be wound or stacked in a package to separate the electrodes in an energy storage device, for example, a battery, capacitor, supercapacitor, or fuel cell. Pores can be filled with electrolyte both in the inorganic surface layers and throughout the bulk structure of the base polymer membrane. Such separators are beneficial to the manufacture of energy storage devices, particularly since they combine good heat resistance, in-plane dimensional stability, reduced interfacial stress, and shutdown characteristics.

Additional aspects and advantages will be apparent from the following detailed description of preferred embodiments, which proceeds with reference to the accompanying drawings.

BRIEF DESCRIPTION OF THE DRAWINGS

FIG. 1 is a photograph of a Mayer rod used in coating an inorganic surface layer on a polyolefin membrane in accordance with the methodology disclosed.

FIGS. 3 and 4 are cross-sectional schematic diagrams showing, respectively, a polyolefin membrane and a colloid-modified polyolefin membrane coated with microporous inorganic surface layers.

FIG. 5 presents upper and lower rows of SEM images showing with three different magnifications the surface and bulk structure, respectively, of a polyolefin membrane in which colloidal particles penetrated the surface of the membrane and into its bulk structure.

FIG. 6 is a diagram of a stainless steel fixture used for electrical resistance measurement of a battery separator.

FIG. 7 is a graph of measured data from which electrical resistance (ER) was determined for an embodiment of a battery separator.

FIG. 8 shows surface and machine direction (MD) fracture SEM images of a silica-coated separator made as described in Example 9.

FIG. 9 shows surface and machine direction (MD) fracture SEM images of a coated separator made as described in Example 16.

FIG. 10 is a bar graph showing the results of peel strength tests performed on two inorganic surface layer-coated separators subjected to various heat treatment conditions.

DETAILED DESCRIPTION OF PREFERRED EMBODIMENTS

The base membrane used is comprised of a polyolefin matrix. The polyolefin most preferably used is an ultrahigh molecular weight polyethylene (UHMWPE) having an intrinsic viscosity of at least 10 deciliter/gram, and preferably in the range from 18-22 deciliters/gram. It is desirable to blend the UHMWPE with other polyolefins such as HDPE or linear low density polyethylene (LLDPE) to impact the shutdown properties of the membrane. Membranes can also be manufactured from other polyolefins or their blends, such as, for example, ethylene-propylene copolymers, polypropylene, and polymethyl pentene.

The plasticizer employed is a nonevaporative solvent for the polymer and is preferably a liquid at room temperature. The plasticizer has little or no solvating effect on the polymer at room temperature; it performs its solvating action at temperatures at or above the softening temperature of the polymer. For UHMWPE, the solvating temperature would be above about 160° C., and preferably in the range of between about 189° C. and about 240° C. It is preferred to use a processing oil, such as a paraffinic oil, naphthenic oil, aromatic oil, or a mixture of two or more such oils. Examples of suitable processing oils include: oils sold by Shell Oil Company, such as Gravex™ 942; oils sold by Calumet Lubricants, such as Hydracal™ 800; and oils sold by Nynas Inc., such as HR Tufflo® 750.

The polymer/oil mixture is extruded through a sheet die or annular die, and then it is biaxially oriented to form a thin, oil-filled sheet. Any solvent that is compatible with the oil can be used for the extraction step, provided it has a boiling point that makes it practical to separate the solvent from the plasticizer by distillation. Such solvents include 1,1,2 trichloroethylene; perchloroethylene; 1,2-dichloroethane; 1,1,1-trichloroethane; 1,1,2-trichloroethane; methylene chloride; chloroform; 1,1,2-trichloro-1,2,2-trifluoroethane; isopropyl alcohol; diethyl ether; acetone; hexane; heptane; and toluene. In some cases, it is desirable to select the processing oil such that any residual oil in the polyolefin membrane after extraction is electrochemically inactive.

Figure 2A:
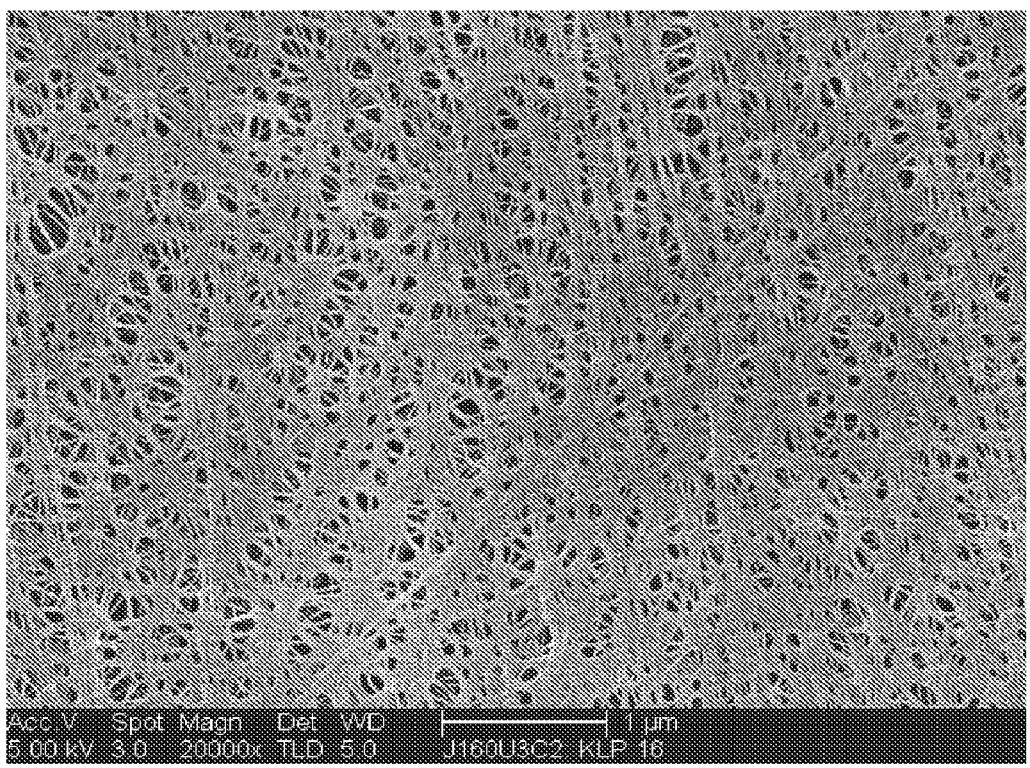
FIGS. 2A and 2B present scanning electron micrographs (SEMS) showing the openings in the surface of a polymer membrane at 20,000× and 40,000× magnifications, respectively.
Figure 2B:
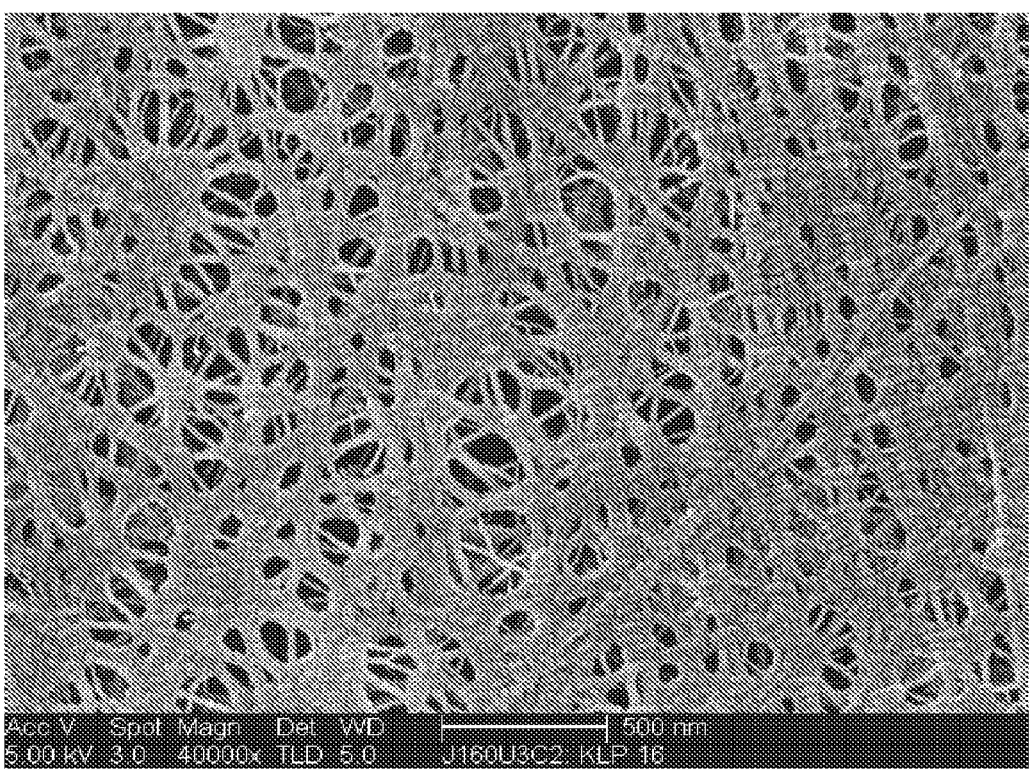

FIGS. 2A and 2B show scanning electron micrographs (SEMS) of an embodiment of a 16 μm polymer membrane at 20,000× and 40.000× magnification, respectively. FIGS. 2A and 2B show that the openings in the surface of the polymer membrane are typically less than 250 nm in diameter, though many are smaller.

The coating formulation used in the first preferred embodiment is composed of inorganic particles dispersed in an aqueous-based dispersion in which greater than 50% water is counted in the liquid phase. The inorganic particles are typically charge stabilized and stay suspended in the alcohol/water mixture. An organic hydrogen bonding component, such as low molecular weight, water-soluble polymer, is also present. It is desirable to choose a polymer with numerous hydrogen bonding sites to minimize its concentration, yet achieve a robust, microporous inorganic surface layer that does not easily shed inorganic particles. Polyvinyl alcohol is a preferred organic hydrogen bonding component such that fewer than 5 parts of PVOH can be used with 95 parts or more of the inorganic particles. This organic hydrogen bonding component imparts high peel strength and good in-plane dimensional stability to the coated membrane, while being suitable for coating application from an aqueous-based dispersion.

FIG. 3 shows a cross-sectional schematic of a polyolefin membrane coated with microporous inorganic surface layers. FIG. 4 shows the cross-sectional schematic of FIG. 3 but with a colloid-modified polyolefin membrane.

In addition to controlling the amount of organic hydrogen bonding component and inorganic particles in the coating formulation, applicants believe it is important to control the particle size distribution of the inorganic particles. Furthermore, the coating formulation was carefully applied to the polyolefin base membrane to control the thickness of the resultant inorganic surface layer.

Examples 1 and 2 demonstrate that the colloidal particles penetrate through the surface and into the bulk structure of the polyolefin membrane.

Example 1

A 16 μm thick, microporous ultrahigh molecular weight polyethylene-containing separator, Entek® KLP (Entek Membranes LLC, Oregon) (see FIGS. 2A and 2B) was used as a polyolefin membrane for coating. The 16 μm Entek® KLP membrane, before coating, is referred to herein as the control. The membrane was dipped through a 275 part isopropyl alcohol:1000 part water solution containing colloidal silica (LUDOX; Sigma-Aldrich Co. LLC) at the following concentrations: 5, 10, and 20 wt. %. Two #00 Mayer rods were used (one on each surface of the membrane) to remove the wet surface layer, and the membrane was then dried with a series of air knives and transported through a vertical oven set at 120° C.

The samples were examined by scanning electron microscopy and energy dispersive x-ray analysis to show that colloidal silica particles penetrated the membrane surface and were present in the bulk structure, as shown with three different magnifications in the SEMs arranged in the bottom row (MD fracture) of FIG. 5.

Example 2

The thermal shrinkage values of the colloidal-modified separators in Example 1 were compared with the 16 μm Entek® KLP control. Three 100 mm×100 mm samples were cut from each separator type. The sample groups were held together with a small binder clip fixed in a corner. The samples were then suspended in an oven at 200° C. for 30 minutes. After closure of the oven, it was evacuated and then backfilled with argon for this test. Upon removal, the samples were cooled to room temperature and then measured to determine their shrinkage in the machine direction (MD) and the transverse direction (TD). The results in Table 1 show that there was a substantial reduction in transverse direction shrinkage as the separators were exposed to higher concentrations of colloidal silica.

TABLE 1

200° C. shrinkage results

| Sample | 200° C. shrinkage | |
|---|---|---|
| | MD % | TD % |
| 16 μm Entek KLP control | 76.7 | 69.2 |
| 5% Ludox | 71.1 | 58.7 |
| 10% Ludox | 68.0 | 57.8 |
| 20% Ludox | 65.6 | 49.5 |

Examples 3-17 relate to inorganic surface layer coating formulations in accordance with a first preferred embodiment.

Example 3

A 16 μm thick, microporous ultrahigh molecular weight polyethylene-containing separator, Entek® KLP (Entek Membranes LLC, Oregon) was coated with an aqueous-based dispersion that contained the following:

| | |
|---|---|
| 25 g | Polyvinyl alcohol (87-89% hydrolyzed; MW = 13-23K; Aldrich) |
| 610 g | Distilled water |
| 275 g | Isopropanol |
| 59 g | LUDOX HS-4G (40 wt. % colloidal silica; Sigma-Aldrich Co. LLC) |
| 1484 g | CAB-O-SPERSE 1030 K (30 wt. % fumed silica; Cabot Corporation). |

The coating dispersion contained 20% solids with a 90:5:5 1030K:LUDOX:PVOH mass ratio. The CAB-O-SPERSE 1030K is an aqueous dispersion of fumed silica with a mean aggregate size of 150 nm and a surface area of 90 m$^2$/g. Two #7 Mayer rods were used (one on each surface of the membrane) in the dip coating operation (residence time about 7 seconds), and the wetted separator was dried as described in Example 1. Shrinkage values of the coated separator in the machine direction (MD) and the transverse direction (TD) were determined, as described in Example 2. The separator had a final thickness of 20.2 μm, a basis weight increase of 3.9 g/m$^2$, a thermal shrinkage of 3.1% in the MD and 2.7% in the TD, and a Gurley value of 483 seconds. A Gurley value is a measure of air permeability determined with use of a Gurley® densometer Model 4340, which measures the time in seconds (s) for 100 cc of air to pass through a 6.45 cm$^2$ membrane at an applied pressure of 1215 Pa.

Example 4

Separator electrical resistance (ER) was measured in a glove box using a fixture with stainless steel electrodes, lithium-ion electrolyte (1M LiPF$_6$ in 1:1 Ethylene Carbonate:Ethyl Methyl Carbonate (EMC)), and an impedance analyzer (Carry PC4 750) operating over a frequency range of 100 kHz to 1 kHz. FIG. 6 is a diagram of the stainless steel fixture used for electrical resistance measurement. The real component of the measured impedance at 100 kHz was plotted for 1, 2, and 3 layers of separator. FIG. 7 is a graph of the measured data from which electrical resistance (ER) was determined. The slope of the linear fit of measured resistance to the number of separator layers was used as the electrical resistance of the separator.

The areal resistance, electrical resistivity, and MacMullin Number measurements were made for the separator samples described in Examples 1 and 3. A comparison to the 16 μm Entek® KLP base membrane is shown in Table 2.

TABLE 2

Electrical resistivity, areal resistance, and MacMullin number data

| Test material description: Coated Entek Series (Test electrolyte: 1.0M LiPF6, 1:1 EC:EMC) | Average Thickness | Areal Resistance | Resistivity Units | MacMullin Number |
|---|---|---|---|---|
| | mm | Ω-cm² | Ω-cm | dim'less |
| J161X831, 16 μm KLP, base membrane | 0.0181 | 3.13 | 1730 | 13.0 |
| J161X833, 16 μm KLP, base membrane | 0.0181 | 2.85 | 1572 | 11.8 |
| CDL130225.001, 5% LUDOX | 0.0178 | 3.16 | 1776 | 13.4 |
| CDL130226.004, 10% LUDOX | 0.0189 | 3.88 | 2051 | 15.4 |
| CDL130204.001, 20% LUDOX | 0.0197 | 5.61 | 2848 | 21.4 |
| CDL130227.006, 90/5/5 1030K/LUDOX/PVOH | 0.0208 | 3.31 | 1595 | 12.0 |

Example 5

A 16 μm thick, microporous ultrahigh molecular weight polyethylene-containing separator, Entek® CLP (Entek Membranes LLC, Oregon) was coated with an aqueous-based dispersion that contained the following:

| | |
|---|---|
| 14.5 g | Polyvinyl alcohol (PVOH, 87-89% hydrolyzed; MW = 13-23K; Aldrich) |
| 1000 g | Distilled water |
| 275 g | Isopropanol |
| 1172 g | CAB-O-SPERSE PG 008 (40 wt. % alumina; Cabot Corporation). |

The coating dispersion contained 19.6 wt. % solids with a 97/3 alumina/polyvinyl alcohol (PVOH) mass ratio. The CAB-O-SPERSE PG 008 is an aqueous dispersion of fumed alumina with a mean aggregate size of 130 nm and a surface area of 81 m²/g.

The separator was dip-coated through a bath containing the aqueous-based dispersion, and the thickness of the wet layer was controlled on each side with a #14 Mayer rod. The wetted separator was then dried with a series of air knives and transported through a vertical oven set at 80° C. and wound on a plastic core, prior to testing. The separator had a final thickness of 20.0 μm and a Gurley value of 464 seconds. The basis weight increased 5 g/m² after the coating and drying operations.

The thermal shrinkage of the coated separator was determined. Three 100 mm×100 mm samples were cut from the separator. The samples were then suspended in an oven at 200° C. for 30 minutes. After closure of the oven, it was evacuated and then backfilled with argon for this test. Upon removal, the samples were cooled to room temperature and then measured to determine their shrinkage in the machine direction (MD) and the transverse direction (TD). Results showed average shrinkage values of 3.4% in the MD and 2.2% in the TD.

Example 6

A 12 μm thick, microporous ultrahigh molecular weight polyethylene-containing separator, Entek® CLP (Entek Membranes LLC, Oregon) was coated with an aqueous-based dispersion that contained the following:

| | |
|---|---|
| 7.14 g | Polyvinyl alcohol (PVOH; 87-89% hydrolyzed; MW = 13-23K; Aldrich) |
| 1000 g | Distilled water |
| 275 g | Isopropanol |
| 1172 g | CAB-O-SPERSE PG 008 (40 wt. % alumina; Cabot Corporation). |

The coating dispersion contained 19.4 wt. % solids with a 98.5/1.5 alumina/polyvinyl alcohol (PVOH) mass ratio. After dip coating the separator through a bath containing the aqueous-based dispersion, two Mayer rods (#9, #12, or #14) were used to control the wet layer thickness on each side. The wetted separator was then dried with a series of air knives and transported through a vertical oven set at 80° C. and wound on a plastic core, prior to testing.

Cut samples were then suspended in an oven at 200° C. for 30 minutes. Upon cooling, sample shrinkage in the machine direction (MD) and the transverse direction (TD) was determined, as described in Example 5. Table 3 shows the separator coating pickup, high temperature thermal stability, and Gurley values for the coated separators using various Mayer rods. The results illustrate that the coating thickness could be controlled while maintaining excellent high temperature thermal stability and low Gurley values. Additionally, increasing the thickness of the inorganic surface layer did not negatively affect the Gurley values of the separators using this formulation.

TABLE 3

Coated separator characteristics

| Composition | Rod # | Wt. pickup (g/m²) | Thickness Pickup (μm) | 200° C. shrinkage MD % | 200° C. shrinkage TD % | Gurley (sec/100 ml) |
|---|---|---|---|---|---|---|
| 98.5/1.5 Alumina/PVOH | #09/09 | 4.72 | 3.0 | 2.9 | 2.9 | 410 |
| 98.5/1.5 Alumina/PVOH | #12/12 | 7.56 | 5.4 | 2.2 | 2.2 | 389 |
| 98.5/1.5 Alumina/PVOH | #14/14 | 8.33 | 6.0 | 2.7 | 2.7 | 378 |

Example 7

A 16 µm thick, microporous ultrahigh molecular weight polyethylene-containing separator, Entek® KLP (Entek Membranes LLC, Oregon) was coated with an aqueous-based dispersion containing the following:

| | |
|---|---|
| 62 g | Polyvinylpyrrolidone (LUVETEC K115, 10% solution in water; MW = 2.2 million; BASF) |
| 1242 g | Distilled water |
| 258 g | Isopropanol |

-continued

| | |
|---|---|
| 500 g | CAB-O-SPERSE PG 008 (40 wt. % alumina; Cabot Corporation). |

The coating dispersion contained 10 wt. % solids with a 97/3 alumina/polyvinylpyrrolidone (PVP) mass ratio. Two #14 Mayer rods were used (one on each surface of the membrane) to control the wet layer thickness; and the separator was then dried with a series of air knives, transported through a vertical oven set at 80° C., and wound on a plastic core, prior to testing. Shrinkage values of the coated separator in the machine direction (MD) and the transverse direction (TD) were determined, as described in Example 5. Table 4 shows the separator coating pickup, high temperature thermal stability, and Gurley values for the coated separator. Results showed excellent high temperature thermal stability and low Gurley values can be obtained for separators with inorganic surface layers containing PVP as the organic hydrogen bonding component.

TABLE 4

Coated separator characteristics

| Composition | Rod # | Wt. pickup (g/m²) | Thickness Pickup (µm) | 200° C. shrinkage MD % | 200° C. shrinkage TD % | Gurley (sec/100 ml) |
|---|---|---|---|---|---|---|
| 97/3 Alumina/PVP | #14/14 | 4.66 | 3.6 | 3.9 | 3.4 | 402 |

Example 8

A 16 µm thick, microporous ultrahigh molecular weight polyethylene-containing separator, Entek® KLP (Entek Membranes LLC, Oregon) was coated with an aqueous-based dispersion that contained the following:

| | |
|---|---|
| 62 g | Polyvinylpyrrolidone (LUVETEC K115, 10% solution in water; MW = 2.2 million; BASF) |
| 942 g | Distilled water |
| 258 g | Isopropanol |
| 800 g | AERODISP W 925 (25 wt. % alumina; Evonik Corporation). |

The coating dispersion contained 10 wt. % solids with a 97/3 alumina/polyvinylpyrrolidone (PVP) mass ratio. The AERODISP W 925 is an aqueous dispersion of fumed alumina with a mean aggregate size of 100 nm and a surface area of 81 m²/g. Two #14 Mayer rods were used (one on each surface of the membrane) in the dip coating operation, and the coated separator was dried as described in Example 5. Shrinkage values at high temperatures were determined by suspending in an oven at 200° C. for 30 minutes and then measuring the change in machine and transverse dimensions upon cooling (see Example 5). Characteristics of the coated separator are described in Table 5.

TABLE 5

Coated separator characteristics

| Composition | Rod # | Wt. pickup (g/m²) | Thickness Pickup (µm) | 200° C. shrinkage MD % | 200° C. shrinkage TD % | Gurley (sec/100 ml) |
|---|---|---|---|---|---|---|
| 97/3 Alumina/PVP | #14/14 | 4.14 | 4.8 | 5.5 | 3.9 | 362 |

Example 9

A 12 µm thick, microporous ultrahigh molecular weight polyethylene-containing separator, Entek® GLP (Entek Membranes LLC, Oregon) was coated with an aqueous-based dispersion containing:

| | |
|---|---|
| 60 g | Polyvinylpyrrolidone (LUVETEC K115, 10% solution in water; MW = 2.2 million; BASF) |
| 1058 g | Distilled water |
| 247 g | Isopropanol |
| 35 g | Colloidal silica (LUDOX; Sigma-Aldrich Co. LLC) |
| 600 g | Fumed silica dispersion (CAB-O-SPERSE 1030 K; 30 wt. % solids; Cabot Corporation). |

The coating dispersion contained 10 wt. % solids with a 90/7/3 fumed silica/colloidal silica/polyvinylpyrrolidone (PVP) mass ratio. Two Mayer rods were used (one on each surface of the membrane) to control the wet layer thickness, and dried as described in Example 5. The separator had a final thickness of 19.8 µm, a weight pickup of 2.9 g/m², and a Gurley value of 560 seconds. Surface and MD fracture SEM images of the coatings are shown in FIG. 8.

Example 10

A 12 µm thick, microporous ultrahigh molecular weight polyethylene-containing separator, Entek® GLP (Entek Membranes LLC, Oregon) was coated with aqueous-based dispersions containing the following:

| | |
|---|---|
| 14.5 g | Polyvinyl alcohol (Kuraray; Mowil 4-88, 88% hydrolyzed) |
| 1275 g | Distilled water |
| 1172 g | Cabosperse PG008 (40 wt. % alumina; Cabot Corporation), | with varying concentrations of surfactant (Dow Q2-5211; 0 wt. %, 0.01 wt,%, 0.1 wt. %, and 0.2 wt. %).

The coating dispersion contained 19.6 wt. % solids with a 97/3 alumina/polyvinyl alcohol mass ratio. Two #09 Mayer rods were used (one on each surface of the membrane) to control the wet layer thickness; and the separator was then dried with a series of air knives, transported through a vertical oven set at 80° C., and wound on a plastic core, prior to testing. Shrinkage of the coated separator in the machine direction (MD) and the transverse direction (TD) was determined, as described in Example 5. Table 8 presents the coating pickup, high temperature thermal stability, and Gurley values for the coated separator. The data show that the inorganic surface layer exhibits excellent high temperature thermal stability, irrespective of whether a surfactant or isopropanol is present in the coating formulation.

TABLE 8

Coated separator characteristics

| Composition | Rod # | Wt. pickup (g/m²) | Thickness pickup (μm) | 200° C. shrinkage MD % | 200° C. shrinkage TD % | Gurley (sec/100 ml) |
|---|---|---|---|---|---|---|
| 97/3 Alumina/PVOH, no IPA, no surfactant | #09/09 | 5.2 | 3.8 | 2.4 | 2.1 | 315 |
| 97/3 Alumina/PVOH, 0.02% surfactant | #09/09 | 5.5 | 3.7 | 2.6 | 1.9 | 344 |
| 97/3 Alumina/PVOH, 0.1% surfactant | #09/09 | 5.6 | 3.6 | 2.6 | 2.6 | 393 |
| 97/3 Alumina/PVOH, 0.2% surfactant | #09/09 | 6.3 | 4.3 | 2.9 | 2.7 | 359 |

Example 11

A 12 μm thick, microporous ultrahigh molecular weight polyethylene-containing separator, Entek® GLP (Entek Membranes LLC, Oregon) was coated with aqueous-based dispersions containing the following:

| | |
|---|---|
| 14.5 g | Polyvinyl alcohol (Kuraray; Mowil 4-88, 88% hydrolyzed) |
| 1172 g | Cabosperse PG008 (40 wt. % alumina; Cabot Corporation). |

The coating dispersion contained 40.7 wt. % solids with a 97/3 alumina/polyvinyl alcohol mass ratio. Two Mayer rods were used (one on each surface of the membrane) to control the wet layer thickness; and the separator was then dried with a series of air knives, transported through a vertical oven set at 80° C., and wound on a plastic core, prior to testing. Shrinkage of the coated separator in the machine direction (MD) and the transverse direction (TD) was determined, as described in Example 5. Table 9 shows the coating pickup, high temperature thermal stability, and Gurley values for the coated separator. This example illustrates that PVOH can be directly dissolved into the aqueous-based dispersion to obtain an inorganic surface layer with high temperature thermal stability,

TABLE 9

Coated separator characteristics

| Composition | Rod # | Wt. pickup (g/m²) | Thickness pickup (μm) | 200° C. shrinkage MD % | 200° C. shrinkage TD % | Gurley (sec/100 ml) |
|---|---|---|---|---|---|---|
| 97/3 Alumina/PVOH | #07/07 | 8.04 | 5.3 | 2.4 | 2.1 | 370 |
| 97/3 Alumina/PVOH | #09/09 | 13.84 | 10.6 | 2.4 | 1.4 | 379 |

Example 12

A 32 μm thick microporous ultrahigh molecular weight polyethylene-containing separator composed of two individual 16 μm thick membrane layers, Entek® HPIP (Entek Membranes LLC, Oregon) was coated with an aqueous-based dispersion containing the following:

| | |
|---|---|
| 14.5 g | Polyvinyl alcohol (Kuraray; Mowil 4-88, 88% hydrolyzed) |
| 1000 g | Distilled water |
| 275 g | Isopropanol |
| 1172 g | Cabosperse PG008 (40 wt. % alumina; Cabot Corporation). |

The coating dispersion contained 20 wt. % solids with a 97/3 alumina/polyvinyl alcohol mass ratio. Two Mayer rods were used (one on each side of the membrane) to control the wet layer thickness; and the separator was then dried with a series of air knives and transported through a vertical oven set at 80° C., as described in Example 5. The separator was then split into its individual layers, leaving one side uncoated and one side coated for each layer. Each layer was wound onto a plastic core prior to testing. Table 10 shows the coating pickup and Gurley values for the coated separators. This example illustrates an extremely efficient method of manufacturing a separator with an inorganic surface layer on only one side of the polyolefin membrane.

TABLE 10

Coated separator characteristics

| Composition | Rod # | Wt. pickup (g/m²) | Thickness pickup (μm) | Gurley (sec/100 ml) |
|---|---|---|---|---|
| 97/3 Alumina/PVOH, Side 1 | #14 | 4.4 | 3.2 | 209 |
| 97/3 Alumina/PVOH, Side 2 | #14 | 4.3 | 3.5 | 216 |

Example 13

A 16 μm thick, microporous polyethylene-based separator prepared using a dry process (Foresight Separator, Foresight Energy Technologies Co. Ltd) was coated with an aqueous-based dispersion containing the following:

| | |
|---|---|
| 100 g | Selvol 21-205 Polyvinyl alcohol aqueous solution (21 wt. %; 88% hydrolyzed; Sekisui) |
| 205 g | Distilled water |
| 1697.5 g | Cabosperse PG008 (40 wt. % alumina; Cabot Corporation). |

The coating dispersion contained 35 wt. % solids with a 97/3 alumina/PVOH mass ratio. After dip coating the separator into a bath containing the alumina dispersion; two Mayer rods (#5, #7, or #10) were used (one on each surface of the membrane) to control the wet layer thickness, and the separator was then dried with a series of air knives, transported through a vertical oven set at 80° C., and wound on a plastic core, prior to testing, Shrinkage of the coated separator in the machine direction (MD) and the transverse direction (TO) was determined, as described in Example 5. Table 11 shows the coating pickup, high temperature thermal stability, and Gurley values for the coated separator.

TABLE 11

Coated separator characteristics

| Composition | Rod # | Wt. pickup (g/m²) | Thickness pickup (μm) | 200° C. shrinkage MD % | 200° C. shrinkage TD % | Gurley (sec/100 ml) |
|---|---|---|---|---|---|---|
| 97/3 alumina/PVOH | #05/05 | 2.24 | 2.2 | 8.2 | 1.1 | 267 |
| 97/3 alumina/PVOH | #07/07 | 4.55 | 4.2 | 7.2 | 1.1 | 340 |
| 97/3 alumina/PVOH | #10/10 | 9.67 | 8.9 | 2.7 | 1.6 | 347 |

Example 14

A 16 μm thick, microporous ultrahigh molecular weight polyethylene-based separator, Entek® KLP (Entek Membranes LLC, Oregon) was coated with an aqueous-based dispersion containing the following:

| | |
|---|---|
| 7.1 g | Selvol 21-205 Polyvinyl alcohol aqueous solution (21 wt. %; 88% hydrolyzed Sekisui) |
| 60 g | Distilled water |
| 70 g | Boehmite (AlO—OH) [5 wt. % in water; see *J. Appl. Chem. Biotechnol.* 1973, 23, 803-09 for preparation] |
| 112.5 g | Cabosperse PG008 (40 wt. % alumina; Cabot Corporation). |

The coating dispersion contained 20 wt. % solids with a 90/7/3 alumina/boehmite/PVOH mass ratio. The separator was dip-coated into a bath containing the aqueous-based dispersion. The coated polyolefin membrane was then dried in an oven set to 80° C. for 30 minutes prior to testing. Shrinkage of the coated separator in the machine direction (MD) and the transverse direction (TO) was determined, as described in Example 5. Table 12 shows the coating pickup, high temperature thermal stability, and Gurley values for the coated separator.

TABLE 12

Coated separator characteristics

| Coating Composition | Wt. pickup (g/m²) | Thickness pickup (μm) | 200° C. shrinkage MD % | 200° C. shrinkage TD % | Gurley (sec/100 ml) |
|---|---|---|---|---|---|
| 90/7/3 alumina/boehmite/PVOH | 11.5 | 8.6 | 2.8 | 1.6 | 345 |

Example 15

A 12 μm thick, microporous ultrahigh molecular weight polyethylene-containing separator, Entek® GLP (Entek Membranes LLC, Oregon) was coated with an aqueous-based dispersion that contained the following:

| | |
|---|---|
| 53.4 g | Pentaerythritol (Aldrich) |
| 1116 g | Distilled water |
| 295 g | Isopropanol |
| 1200 g | CAB-O-SPERSE PG 008 (40 wt. % alumina; Cabot Corporation). |

The coating dispersion contained 20 wt. % solids with a 90/10 alumina/pentaerythritol mass ratio. Two #09 Mayer rods (one on each surface of the membrane) were used to control the wet layer thickness; and the separator was then dried with a series of air knives, transported through a vertical oven set at 80° C., and wound on a plastic core, prior to testing. Shrinkage values of the coated separator in the machine direction (MD) and the transverse direction (TD) were determined, as described in Example 5. Table 13 shows the separator coating pickup, high temperature thermal stability, and Gurley values for the coated separator.

TABLE 13

Coated separator characteristics

| Composition | Rod # | Wt. pickup (g/m$^2$) | Thickness pickup (μm) | 200° C. shrinkage MD % | 200° C. shrinkage TD % | Gurley (sec/100 ml) |
|---|---|---|---|---|---|---|
| 90/10 Alumina/Pentaerythritol | #09/09 | 5.67 | 3.0 | 4.5 | 3.1 | 406 |

Example 16

A 12 μm thick, microporous ultrahigh molecular weight polyethylene-containing separator, Entek® GLS' (Entek Membranes LLC, Oregon) was coated with aqueous-based dispersions that contained 20 wt % solids with 90/10 and 80/20 alumina/sucrose mass ratios. Compositions of each of the aqueous-based dispersions prepared are described in Table 14.

TABLE 14

Dispersion Compositions

| Description of coating | Sucrose (g) (Aldrich) | DI water (g) | Isopropyl Alcohol (g) | PG008 Dispersion (g) Cabot) |
|---|---|---|---|---|
| 90/10 mass ratio Alumina/Sucrose | 20 | 420 | 110 | 450 |
| 80/20 mass ratio Alumina/Sucrose | 40 | 450 | 110 | 400 |

Two #09 Mayer rods were used (one on each surface of the membrane) to control the wet layer thickness; and the separator was then dried with a series of air knives, transported through a vertical oven set at 80° C., and wound on a plastic core, prior to testing. Shrinkage of the coated separator in the machine direction (MD) and the transverse direction (TD) was determined, as described in Example 5. Table 15 shows the coating pickup, high temperature thermal stability, and Gurley values for the coated separator. Surface and MD fracture SEM images of a 90/10 alumina/sucrose coating mass ratio is shown in FIG. 9. This example illustrates that small molecules with high hydrogen bonding abilities can be incorporated into the inorganic surface layer to yield high temperature thermal stability of the coated separator.

TABLE 15

Coated separator characteristics

| Composition | Rod # | Wt. pickup (g/m$^2$) | 200° C. shrinkage MD % | 200° C. shrinkage TD % | Gurley (sec/100 ml) |
|---|---|---|---|---|---|
| 90/10 alumina/sucrose | #09/09 | 5.5 | 2.4 | 1.2 | 401 |
| 80/20 alumina/sucrose | #09/09 | 5.0 | 23.6 | 26.2 | 437 |

Example 17

A 12 μm thick, microporous ultrahigh molecular weight polyethylene-containing separator, Entek® GLP (Entek Membranes LLC, Oregon) was coated with aqueous-based dispersions that contained 20 wt. % solids with 90/10, 80/20, and 70/30 alumina/maltitol mass ratios. Compositions of each of the coating dispersions prepared are described in Table 16.

TABLE 16

Dispersion Compositions

| Description of coating | Maltitol (g) (Aldrich) | DI water (g) | Isopropyl Alcohol (g) | PG008 Dispersion (g) Cabot) |
|---|---|---|---|---|
| 90/10 mass ratio Alumina/Maltitol | 20 | 420 | 110 | 450 |
| 80/20 mass ratio Alumina/Maltitol | 40 | 450 | 110 | 400 |
| 70/30 mass ratio Alumina/Maltitol | 60 | 480 | 110 | 350 |

Two #09 Mayer rods were used (one on each surface of the membrane) to control the wet layer thickness; and the separator was then dried with a series of air knives, transported through a vertical oven set at 80° C., and wound on a plastic core, prior to testing. Shrinkage of the coated separator in the machine direction (MD) and the transverse direction (TD) was determined, as described in Example 5. Table 17 shows the coating pickup, high temperature thermal stability, and Gurley values for the coated separator. This example further shows that small molecules with high hydrogen bonding abilities can be incorporated into the inorganic surface layer to yield high temperature thermal stability of the coated separator.

TABLE 17

Coated separator characteristics

| Composition | Rod # | Wt. pickup (g/m²) | 200° C. shrinkage MD % | 200° C. shrinkage TD % | Gurley (sec/100 ml) |
|---|---|---|---|---|---|
| 90/10 alumina/maltitol | #09/09 | 5.08 | 2.6 | 3.1 | 389 |
| 80/20 alumina/maltitol | #09/09 | 5.63 | 8.8 | 22.9 | 393 |
| 70/30 alumina/maltitol | #09/09 | 4.88 | 27.2 | 39.3 | 644 |

Example 18 related to an inorganic surface layer coating formulation achieved by hydrogen bonding with use of an inorganic acid, in accordance with a second preferred embodiment.

Example 18

A 16 μm thick, microporous ultrahigh molecular weight polyethylene-containing separator, Entek® KLP (Entek Membranes LLC, Oregon) was coated with aqueous-based dispersions containing the following:

| | |
|---|---|
| 10 g | Boric acid (Aldrich) |
| 405 g | Distilled water |
| 110 g | Isopropanol |
| 475 g | Cabosperse PG008 (40 wt. % alumina; Cabot Corporation). |

The coating dispersion contained 20 wt. % solids with a 95/5 alumina/boric acid mass ratio. Two Mayer rods were used (one on each surface of the membrane) to control the wet layer thickness; and the separator was then dried with a series of air knives, transported through a vertical oven set at 80° C., and wound on a plastic core, prior to testing. Shrinkage of the coated separator in the machine direction (MD) and the transverse direction (TD) was determined, as described in Example 5. Table 18 shows the coating pickup, high temperature thermal stability, and Gurley values for the coated separators. This example illustrates that an inorganic acid can be incorporated to provide excellent high temperature thermal stability of the coated separators. Additionally, this example illustrates the importance of inorganic surface layer coating pickup on the thermal shrinkage properties of the coated separators.

TABLE 18

Coated separator characteristics

| Composition | Rod # | Wt. pickup (g/m²) | Thickness pickup (μm) | 200° C. shrinkage MD % | 200° C. shrinkage TD % | Gurley (sec/100 ml) |
|---|---|---|---|---|---|---|
| 95/5 alumina/boric acid | #07/07 | 3.59 | 2.8 | 48.8 | 32.7 | 326 |
| 95/5 alumina/boric acid | #09/09 | 4.63 | 3.1 | 11.7 | 9.8 | 382 |
| 95/5 alumina/boric acid | #12/12 | 6.14 | 4.6 | 3.5 | 1.6 | 357 |

Examples 19 and 20 relate to inorganic surface layer coating formulations achieved by one or both of hydrogen bonding and chemical reaction of the surface groups on the inorganic particles.

Example 19

A 12 μm thick, microporous ultrahigh molecular weight polyethylene-containing separator, Entek® GLP (Entek Membranes LLC, Oregon) was coated with an aqueous-based dispersion that contained the following:

| | |
|---|---|
| 1000 g | Distilled water |
| 275 g | Isopropanol |
| 1172 g | CAB-O-SPERSE PG 008 (40 wt. % alumina; Cabot Corporation). |

The coating dispersion contained 19.2 wt. % solids and only alumina particles. This coating dispersion is analogous to that of Example 5, with the exception that the resultant inorganic surface layer contains no organic hydrogen bonding component. Two #09 Mayer rods were used (one on each surface of the membrane) to control the wet layer thickness; and the separator was then dried with a series of air knives, transported through a vertical oven set at 80° C., and wound on a plastic core, prior to testing. Shrinkage values of the coated separator in the machine direction (MD) and the transverse direction (TD) were determined, as described in Example 5. Table 19 shows the separator coating pickup, high temperature thermal stability, and Gurley values for the coated separator,

TABLE 19

Coated separator characteristics

| Composition | Rod # | Wt. pickup (g/m²) | Thickness pickup (μm) | 200° C. shrinkage MD % | 200° C. shrinkage TD % | Gurley (sec/100 ml) |
|---|---|---|---|---|---|---|
| Alumina | #09/09 | 5.44 | 3.5 | 4.2 | 2.1 | 343 |

Example 20

A 16 μm thick, microporous ultrahigh molecular weight polyethylene-based separator, Entek® KLP (Entek Membranes LLC, Oregon) was coated with an aqueous-based dispersion containing the following:

| | |
|---|---|
| 100 g | Boehmite (AlO—OH) [5 wt. % in water; see *J. Appl. Chem. Biotechnol.* 1973, 23, 803-09 for preparation] |
| 20 g | Isopropanol |
| 100 g | Cabosperse PG008 (40 wt. % alumina; Cabot Corporation). |

The coating dispersion contained 20.5 wt. % solids with a 89/11 alumina/boehmite mass ratio. The separator was dip-coated into a bath containing the aqueous-based dispersion. The coated polyolefin membrane was then dried in an oven set to 80° C. for 30 minutes prior to testing. Shrinkage of the coated separator in the machine direction (MD) and the transverse direction (TD) was determined, as described in Example 5. Table 20 shows the coating pickup, high temperature thermal stability, and Gurley values for the coated separator.

TABLE 20

Coated separator characteristics

| Coating Composition | Wt. pickup (g/m$^2$) | Thickness pickup (μm) | 200° C. shrinkage MD % | 200° C. shrinkage TD % | Gurley (sec/100 ml) |
|---|---|---|---|---|---|
| 89/11 alumina/ boehmite | 19.8 | 15.6 | 5.3 | 5.3 | 387 |

Applicants believe that the inorganic surface layers containing no organic hydrogen bonding component bond to the separator as described below. The porous particles in the inorganic surface layer are characterized by open chainlike morphology to form a virtual network at the surface of the polyolefin membrane. The particles of the inorganic surface layer are held together by particle-to-particle contacts that include mechanical interlocking and hydrogen bonding. Preferred metal oxide particles include fumed alumina, silica, titania, and zirconia. The inorganic surface layer is thought to be held to the separator by mechanical interlocking to its surface pores.

The following example demonstrates the effect of heat treatment on the adhesive strength of coated separators.

Example 21

Two different separators were used to study the effect of heat treatment on the inorganic surface layer adhesive strength to the polyolefin membrane. In the first case, the inorganic surface layer contained only alumina particles (see Example 19). In the second case, the inorganic surface layer was prepared from an aqueous-based coating dispersion having a 95/5 alumina/boric acid mass ratio (see Example 18).

To study the effect of heat treatment on coating adhesion strength, three different conditions were employed:
1) a control condition in which no heat treatment was performed;
2) a heat treatment using calendar rolls (Innovative Machine Corp.), with a gap set to 20 μm, a roll temperature of 125° C., and a roller speed of 1 ft/minute (30.5 cm/minute); and
3) en oven heat treatment at 125° C. for 4 hours in vacuum.

An inorganic surface layer adhesive strength test was performed, in which each coated separator was placed horizontally on a steel plate and magnetic strips were placed on the edges of the separator to secure the separator. A pressure sensitive tape (3M Scotch® Magic™ Tape 810, ¾ inch (1.9 cm) width), was applied to the coated separator. The free end of the tape was secured to a fixture dip, and the tape was peeled at 180° from the original tape orientation (i.e., 180° peel test configuration) at a speed of 0.1 inch/second (2.54 mm/second) and a distance of 4.5 inches (11.4 cm). A force gauge (Chatillon, DFGS-R-10) with a 10±0.005 lbs. (4 kg±2.7 g) load cell capacity was used to measure the force required to remove the inorganic surface layer from the base polyolefin membrane, and the maximum load was recorded. The test was repeated at least three times for each sample. All testing was performed at room temperature. FIG. 10 is a bar graph showing the results of a peel strength test of the two coated separators that underwent (1) no heat treatment, (2) calender roll heat treatment at 125° C., and (3) oven heat treatment at 125° C. in vacuum.

Results showed that both coated separators had improved inorganic surface layer adhesive strength after heat treatment. A comparison between heat treatments revealed that, the longer the residence time, the better the adhesion. Coated separators containing boric acid showed much improved adhesive strength after heat treatment compared to coated separators containing only alumina particles. Only small differences in Gurley values were observed before and after heat treatment. For the sample containing 95/5 mass ratio alumina/boric acid, the average Gurley value before oven heat treatment was 324 s compared to 352 s after oven heat treatment. This example illustrates that heat treatment can be used to improve the adhesive strength of the coating with only a minimal decrease in air permeability.

The following example demonstrates the effect of corona treatment on adhesive strength and wetting.

Example 22

A 16 μm thick, microporous ultrahigh molecular weight polyethylene-containing separator, Entek® KLP (Entek Membranes LLC, Oregon) was corona treated with an Enercon TL Max™ web surface treater. The corona treatment settings were adjusted to a Watt density of 3.99 Watts/ft$^2$/miry, gap distance of 0.06 inch (1.5 mm), and a speed of 65 ft/min (19.8 m/min). After corona treatment, the surface energy increased from 35 Dynes to 52 Dynes, and the water contact angle decreased from 86° to 56°.

Entek® 16 μm KLP membranes with and without corona treatment were passed through three different aqueous-based coating dispersions: (1) a coating dispersion containing 20 wt. % solids with only alumina particles (Cabosperse PG008), (2) a coating dispersion containing 20 wt. % solids with a 95/5 alumina/boric acid mass ratio, and (3) a coating dispersion containing 20 wt. % solids with a 95/10 alumina/boric acid mass ratio. Compositions for each of the aqueous-based dispersions are described in Table 21.

TABLE 21

Coating Compositions

| Description of coating | Boric acid (g) (Aldrich) | DI water (g) | Isopropyl Alcohol (g) | PG008 Dispersion (g) |
|---|---|---|---|---|
| Alumina coating | 0 | 390 | 110 | 500 |
| 95/5 Alumina/ Boric Acid | 10 | 405 | 110 | 475 |
| 90/10 Alumina/ Boric Acid | 20 | 420 | 110 | 450 |

Each of the separators was dip-coated through a bath containing the aqueous-based dispersion, and the thickness of the wet layer was controlled on each side with a #9 Mayer rod. The separator was then dried with a series of air knives, transported through a vertical oven set at 80° C., and wound on a plastic core, prior to testing. Thermal shrinkage of the coated separator in the machine direction (MD) and the transverse direction (TD) was determined, as described in Example 5.

Table 22 shows the coating weight/thickness pickup, high temperature thermal stability, and Gurley values for the coated separators prepared. A higher weight/thickness pickup was seen when coating onto corona treated separators as compared to when coating onto untreated separators. Additionally, there was a clear improvement in wetting in the separator upon corona treatment. For example, when attempting to coat the aqueous-based dispersion containing a 90/10 alumina/boric acid mass ratio on an untreated separator, the aqueous-based dispersion beaded up, thus resulting in a very uneven coating with poor quality. In contrast, when applying this same aqueous-based dispersion to the corona treated separator, the coating was applied very smoothly, and the quality of the coating was much improved.

TABLE 22

Coated separator characteristics

| Coating Composition | Corona Treatment? | Basis Wt. g/m² | Thickness μm | 200° C. Shrinkage MD % | TD % | Gurley Sec/100 ml |
|---|---|---|---|---|---|---|
| Alumina (PG008) | No | 13.9 | 19.9 | 26.2 | 17.3 | 352 |
| Alumina (PG008) | Yes | 14.6 | 20.9 | 16.3 | 11.4 | 350 |
| 95/5 Alumina/Boric Acid | No | 14.2 | 20.6 | 17.7 | 9.8 | 332 |
| 95/5 Alumina/Boric Acid | Yes | 15.6 | 21.9 | 3.1 | 1.6 | 362 |
| 90/10 Alumina/Boric Acid | No | | | Coating beaded | | |
| 90/10 Alumina/Boric Acid | Yes | 14.5 | 22.2 | 3.1 | 2.6 | 358 |

The inorganic surface layer adhesive strength was determined using the peel test method described in Example 21. Results are shown in Table 23, illustrating that the inorganic surface layer adhesive strength was significantly improved when the corona treatment was applied. Additionally, formulations with higher concentrations of boric acid resulted in more substantial improvements in the inorganic surface layer adhesive strength. This example illustrates the ability to improve adhesion of the inorganic surface layer and wetting of the coating dispersion when corona treatment is applied to the base polyolefin membrane.

TABLE 23

Effect of corona treatment on peel strength of coated separators

| Coating Composition | Peel Stength (lbs) | | | |
|---|---|---|---|---|
| | No Treatment | (SD) | Corona Treatment | (SD) |
| Alumina | 0.025 | 0.003 | 0.043 | 0.008 |
| 95/5 Alumina/Boric Acid | 0.023 | 0.003 | 0.082 | 0.012 |
| 90/10 Alumina/Boric Acid | — | — | 0.182 | 0.003 |

It will be obvious to those having skill in the art that many changes may be made to the details of the above-described embodiments without departing from the underlying principles of the invention. For example, an inorganic surface layer may be applied as a coating on a portion (e.g., a patterned coating) of the surface or the entire surface of a polyolefin membrane. The scope of the invention should, therefore, be determined only by the following claims.

The invention claimed is:

1. A freestanding polyolefin web, comprising:
   a microporous polyolefin membrane having a surface and a bulk structure, the polyolefin membrane characterized by a melting point;
   an aqueous dispersion-formed porous inorganic surface layer containing an organic hydrogen bonding component, and inorganic particles which are at least partially coated with and uniformly dispersed within the organic hydrogen bonding component,
   wherein the inorganic particles comprise fumed inorganic particles and other inorganic particles consisting of colloidal inorganic particles, boehmite, or combinations thereof,
   wherein the porous inorganic surface layer containing about 50 wt % to about 99 wt % fumed inorganic particles, less than or equal to 3 wt % of the organic hydrogen bonding component, and the balance of which being the other inorganic particles,
   wherein the fumed inorganic particles have a mean aggregate size of about 100 nm to about 300 nm and a specific surface area of about 50 m²/g to about 225 m²/g,
   wherein the porous inorganic surface layer covers at least a portion of the surface of the polyolefin membrane,
   wherein the organic hydrogen bonding component comprises a polymeric organic hydrogen bonding component, a molecule with multiple hydrogen bonding sites, or a combination thereof, and
   wherein the polyolefin web exhibits in-plane dimensional stability above the melting point of the polyolefin membrane.

2. The polyolefin web of claim 1, in which the inorganic surface layer further includes an inorganic acid.

3. The polyolefin web of claim 1, in which the molecules are selected from a group including sucrose, maltitol, catechol, pentaerythritol, tannic acid, and dimethylol dihydroxyethylene urea.

4. The polyolefin web of claim 1, in which the other inorganic particles include boehmite.

5. The polyolefin web of claim 1, wherein the microporous polyolefin membrane comprises a polyolefin matrix and colloidal inorganic particles distributed therein.

6. The polyolefin web of claim 1, in which the polyolefin web exhibits pore collapse in the polyolefin membrane and less than 5% shrinkage in either of its in-plane axes at 50° C. above the melting point of the polyolefin membrane.

7. The polyolefin web of claim 1, in which the fumed inorganic particles comprise fumed silica, fumed alumina, or a combination thereof.

8. A freestanding polyolefin web, comprising:
a microporous polyolefin membrane having a surface and a bulk structure, the polyolefin membrane characterized by a melting point;
an aqueous dispersion-formed porous inorganic surface layer containing an organic hydrogen bonding component, and inorganic particles which are at least partially coated with and uniformly dispersed within the organic hydrogen bonding component,
wherein the porous inorganic surface layer contains about 97 wt % to about 99 wt % fumed inorganic particles and less than or equal to 3 wt % of the organic hydrogen bonding component,
wherein the fumed inorganic particles have a mean aggregate size of about 100 nm to about 300 nm and a specific surface area of about 50 $m^2/g$ to about 225 $m^2/g$,
wherein the porous inorganic surface layer covers at least a portion of the surface of the polyolefin membrane,
wherein the organic hydrogen bonding component comprises a polymeric organic hydrogen bonding component, a molecule with multiple hydrogen bonding sites, or a combination thereof, and
in which the polyolefin web exhibits in-plane dimensional stability above the melting point of the polyolefin membrane.

9. The polyolefin web of claim 8, in which the inorganic surface layer further includes an inorganic acid.

10. The polyolefin web of claim 8, in which the molecules are selected from a group including sucrose, maltitol, catechol, pentaerythritol, tannic acid, and dimethylol dihydroxyethylene urea.

11. The polyolefin web of claim 8, in which the microporous polyolefin membrane comprises colloidal inorganic particles distributed throughout the bulk structure.

12. The polyolefin web of claim 8, in which the polyolefin web exhibits pore collapse in the polyolefin membrane and less than 5% shrinkage in either of its in-plane axes at 50° C. above the melting point of the polyolefin membrane.

13. The polyolefin web of claim 8, in which the fumed inorganic particles comprise fumed silica, fumed alumina, or a combination thereof.

14. A freestanding polyolefin web, comprising:
a microporous polyolefin membrane having a surface and a bulk structure, wherein the microporous polyolefin membrane comprises a polyolefin matrix characterized by a melting point;
an aqueous dispersion-formed porous inorganic surface layer containing
an organic hydrogen bonding component, and inorganic particles which are at least partially coated with and uniformly dispersed within the organic hydrogen bonding component,
wherein the inorganic particles comprise fumed inorganic particles and other inorganic particles consisting of colloidal inorganic particles, boehmite, or combinations thereof,
wherein the porous inorganic surface layer containing about 50 wt % to about 99 wt % fumed inorganic particles, less than or equal to 3 wt % of the organic hydrogen bonding component, and the balance of which being the other inorganic particles,
wherein the fumed inorganic particles have a mean aggregate size of about 100 nm to about 300 nm and a specific surface area of about 50 $m^2/g$ to about 225 $m^2/g$,
wherein the porous inorganic surface layer covers at least a portion of the surface of the polyolefin membrane, and
wherein the polyolefin web exhibits in-plane dimensional stability above the melting point of the polyolefin membrane.

15. The polyolefin web of claim 14, in which the inorganic surface layer further includes an inorganic acid.

16. The polyolefin web of claim 14, in which the the organic hydrogen bonding component comprises a molecule with multiple hydrogen bonding sites selected from a group including sucrose, maltitol, catechol, pentaerythritol, tannic acid, and dimethylol dihydroxyethylene urea.

17. The polyolefin web of claim 14, in which the other inorganic particles include boehmite.

18. The polyolefin web of claim 14, wherein the organic hydrogen bonding component comprises a polymeric organic hydrogen bonding component, a molecule with multiple hydrogen bonding sites, or a combination thereof.

* * * * *